United States Patent
Gorecki et al.

(10) Patent No.: US 7,330,506 B2
(45) Date of Patent: Feb. 12, 2008

(54) SYSTEM AND METHOD FOR PROVIDING VARIABLE DELAY FIR EQUALIZER FOR SERIAL BASEBAND COMMUNICATIONS

(75) Inventors: James Gorecki, Hillsboro, OR (US); John T. Stonick, Portland, OR (US)

(73) Assignee: Synopsys, Inc., Mountain View, CA (US)

( * ) Notice: Subject to any disclaimer, the term of this patent is extended or adjusted under 35 U.S.C. 154(b) by 799 days.

(21) Appl. No.: 10/222,166

(22) Filed: Aug. 16, 2002

(65) Prior Publication Data

US 2003/0035474 A1   Feb. 20, 2003

Related U.S. Application Data

(60) Provisional application No. 60/313,478, filed on Aug. 20, 2001, provisional application No. 60/313,214, filed on Aug. 17, 2001, provisional application No. 60/313,454, filed on Aug. 20, 2001, provisional application No. 60/313,455, filed on Aug. 20, 2001, provisional application No. 60/313,456, filed on Aug. 20, 2001, provisional application No. 60/313,477, filed on Aug. 20, 2001.

(51) Int. Cl.
*H03H 7/30* (2006.01)
*H03K 5/159* (2006.01)

(52) U.S. Cl. ..................... 375/232; 708/323

(58) Field of Classification Search ........ 375/229–232; 708/301, 319, 322, 323
See application file for complete search history.

(56) References Cited

U.S. PATENT DOCUMENTS

| | | | |
|---|---|---|---|
| 5,828,701 A * | 10/1998 | Henriksson | 375/233 |
| 6,169,767 B1 | 1/2001 | Strolle et al. | 375/302 |
| 2003/0058955 A1 * | 3/2003 | Raghavan | 375/265 |
| 2004/0252755 A1 * | 12/2004 | Jaffe et al. | 375/233 |

FOREIGN PATENT DOCUMENTS

| | | |
|---|---|---|
| WO | WO 97/34397 | 9/1997 |
| WO | WO 00/16525 | 3/2000 |

OTHER PUBLICATIONS

"IC-Friendly Line Codes for Direct-Conversion Receivers", by Dongling Pan et al., Radio and Wireless Conference, 2000 IEEE Sep. 10-13, XP010521029, pp. 79-81.
"Binary Code Suitable for Line Transmission", by Griffith J M, Electronic Letters, IEE Stevenage, GB, vol. 5, No. 4, Feb. 20, 1969, XP000761084, pp. 79-81.

* cited by examiner

*Primary Examiner*—David B. Lugo
(74) *Attorney, Agent, or Firm*—Park, Vaughan & Fleming LLP

(57) ABSTRACT

The present invention relates in general to a method, apparatus, and article of manufacture for providing high-speed digital communications through a communications channel. In one aspect, the present invention employs variable delay FIR equalizer in the transmitter module to increase the system performance in channel communications.

12 Claims, 7 Drawing Sheets

SYSTEM AND METHOD FOR PROVIDING VARIABLE DELAY FIR EQUALIZER FOR SERIAL BASEBAND COMMUNICATIONS

CROSS-REFERENCE TO RELATED APPLICATIONS

This application claims priority to U.S. Provisional Patent Application Ser. No. 60/313,478, entitled "Variable Delay FIR Equalizer for Serial Baseband Communications", filed Aug. 20, 2001, and U.S. Provisional Application Ser. No. 60/313,214, entitled "Transceiver Apparatus and Method", filed Aug. 17, 2001. The contents of these provisional applications are incorporated, in their entirety, by reference herein.

This application is related to U.S. Provisional Patent Application Ser. No. 60/313,454, entitled "Transceiver System for High Speed Digital Signaling", filed Aug. 20, 2001; U.S. Provisional Patent Application Ser. No. 60/313,455, entitled "Automatic Slicer Level Adaptation", filed Aug. 20, 2001; U.S. Provisional Patent Application Ser. No. 60/313,456, entitled "Variable Rate Sub-Channel Using Block Code RDS", filed Aug. 20, 2001; U.S. Provisional Patent Application Ser. No. 60/313,477, entitled "Crosstalk Management for High-Speed Signaling Links", filed Aug. 20, 2001; and U.S. Provisional Patent Application Ser. No. 60/313,477, entitled "Method and Apparatus for Encoding and Decoding Digital Communications Data", filed Aug. 20, 2001. These applications are hereby incorporated herein by reference.

This application is also related to non-provisional patent applications that claim priority to one or more of the above-referenced provisional patent applications. These non-provisional patent applications are entitled "System and Method for High Speed Digital Signaling", filed Aug. 16, 2002 (application Ser. No. 10/222,122); "System and Method for Providing Slicer Level Adaptation", filed Aug. 16, 2002 (application Ser. No. 10/222,073); "System and Method for Embedding a Sub-Channel in a Block Coded Data Stream", filed Aug. 16, 2002 (application Ser. No. 10/222,071); "System and Method for Providing Crosstalk Management for High-Speed Signaling Links", filed Aug. 16, 2002 (application Ser. No. 10/222,072); and "Method and Apparatus for Encoding and Decoding Digital Communications Data", filed Aug. 16, 2002 (application Ser. No. 10/222,254). The aforementioned non-provisional applications are hereby incorporated by reference, in their entirety, herein.

BACKGROUND OF THE INVENTION

This application relates in general to a method, apparatus, and article of manufacture for providing high speed digital communications through a communications channel, and more particularly to a method, apparatus, and article of manufacture for providing a variable delay finite impulse response equalizer for baseband communications.

Digital communications systems are continuously increasing the transfer rate at which data is transmitted between devices through a communications channel, for example, a backplane. To meet that increase, conventional systems have employed certain techniques of increasing the rate of the transmitted signal or increasing the number of bits per symbol while maintaining the transmission rate. The first approach is problematic in that most distortions that plague communications systems increase with increasing frequency and thus the fidelity of the received signal is degraded. The second approach is also problematic because the voltage margin is reduced when including more information per transmitted symbol. The result is that either approach may require an improvement in received signal quality to maintain a given quality of service.

A common approach to address this situation is to utilize an equalizer (adaptive or otherwise) to compensate for the increased distortion and/or the increased sensitivity to distortion. However, including an equalizer adds cost, complexity and power consumption to a receiver or transceiver. Thus, there is a strong desire to develop an equalizer structure that can provide the required compensation with a minimum of complexity.

Typically, a conventional symbol spaced equalizer implemented as a discrete-time system can correct for a channel pulse response duration or length of $N*Tsym$ seconds, where N is the number of taps of the equalizer and Tsym is the symbol period. A fractionally spaced equalizer implemented as a discrete-time system can correct for a channel pulse response duration or length of $N*Ttap$ seconds, where N is the number of taps of the equalizer and Ttap is the tap period which is a fraction of a symbol period.

However, in certain situations, a subset of the taps in the equalizer may be zero. One such situation may occur in systems in which daughter cards are plugged into a motherboard. Thus, it may be desirable to eliminate the circuitry for taps that would converge to zero. However, after design and manufacture, conventional symbol spaced equalizers have limited flexibility when implemented within a particular environment.

Thus, there is a need for an improved variable equalizer in order to enhance the system performance of, for example, high-speed digital communications through a communications channel, for example a backplane. There is a need for an equalizer with improved flexibility and spanning a large time range without requiring the circuitry and complexity of the intermediate taps that may not be used in a given situation.

SUMMARY OF THE INVENTION

The present invention relates in general to a method, apparatus, and article of manufacture for providing high-speed digital communications through a communications channel, for example a backplane.

In one aspect, the present invention is an equalizer structure that consists of one or more taps that are movable. This equalizer structure may be implemented in the transmitter and/or the receiver to enhance the performance of the communications system.

The equalizer structure of the present invention may also permit a span of a large time range without the burden of unnecessary circuitry and complexity of intermediate taps that may not be employed (for a given or all situations). In short, increased performance in channel communications may be achieved using a variable delay finite impulse response ("FIR") equalizer pursuant to the present invention.

BRIEF DESCRIPTION OF THE DRAWINGS

In the course of the detailed description to follow, reference will be made to the attached drawings. These drawings show different aspects of the present invention and, where appropriate, reference numerals illustrating like structures, components and/or elements in different figures are labeled similarly. It is understood that various combinations of the structures, components and/or elements other than those specifically illustrated are contemplated and within the scope of the present invention.

DETAILED DESCRIPTION

In the following detailed description of exemplary embodiments of the invention, reference is made to the accompanied drawings, which form a part hereof, and which is shown by way of illustration, specific exemplary embodiments of which the invention may be practiced. These embodiments are described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise. The term "connected" means a direct connection between the items connected, without any intermediate devices. The term "coupled" means either a direct connection between the items connected, or an indirect connection through one or more passive or active intermediary devices. The term "circuit" means either a single component or a multiplicity of components, either active and/or passive, that are coupled together to provide or perform a desired function. The term "signal" means at least one current, voltage, or data signal. The term "module" means a circuit (whether integrated or otherwise), a group of such circuits, a processor(s), a processor(s) implementing software, or a combination of a circuit (whether integrated or otherwise), a group of such circuits, a processor(s) and/or a processor(s) implementing software.

Figure 1:
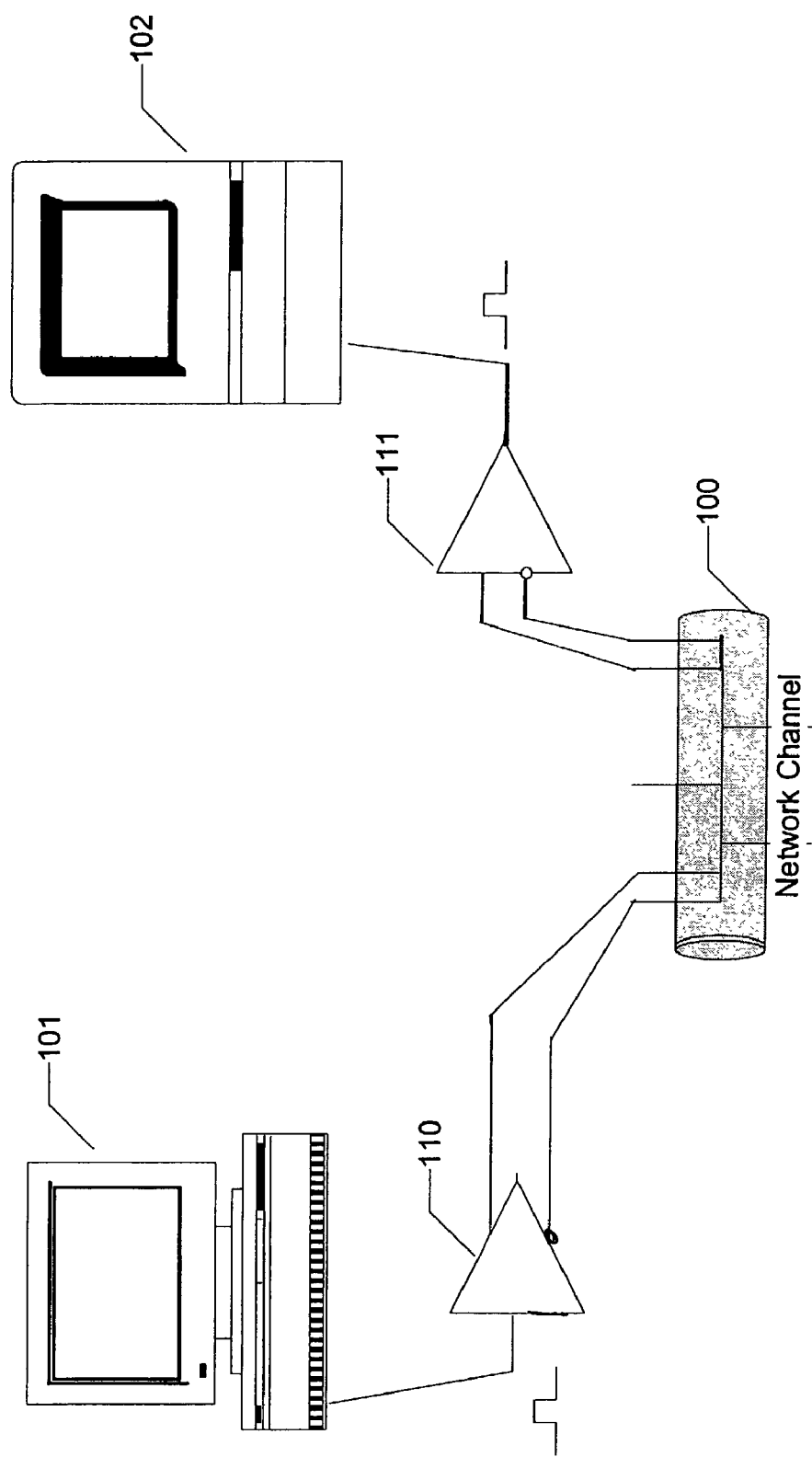
FIG. 1 illustrates an exemplary communications channel between two digital processing devices according to one embodiment of the present invention.

FIG. 1 illustrates an exemplary communications channel between two digital processing devices according to one embodiment of the present invention. Digital processing devices 101 and 102, such as personal computers, communicate with each other by transmitting digital signals through communications channel 100. In one embodiment, a digital representation of the data to be transmitted is encoded and transformed into an electronic signal capable of passing through communications channel 100. The electronic signal is transmitted by transmitter 110 to receiver 111. The received electronic signal, which may be distorted with respect to the electronic signal transmitted into or onto the channel by transmitter 110, is processed and decoded by receiver 111 to reconstruct a digital representation of the transmitted information.

The communications channel 100 may be, for example, constructed using one or more cables, wires, traces or the like, or may be part of a backplane, or may be a wireless communications medium through which the signal passes from transmitter 110 to receiver 111. One skilled in the art will recognize that any such communications media, when used in conjunction with a corresponding transmitter/receiver pair appropriate for a particular medium, may be used to construct a communications channel in accordance with the present invention. For example, other channels that may be implemented in the present invention include electronic, optical or wireless. Indeed, all types of channels of communication (i.e., communication channels), whether now known or later-developed, are intended to be within the scope of the present invention.

Figure 2:
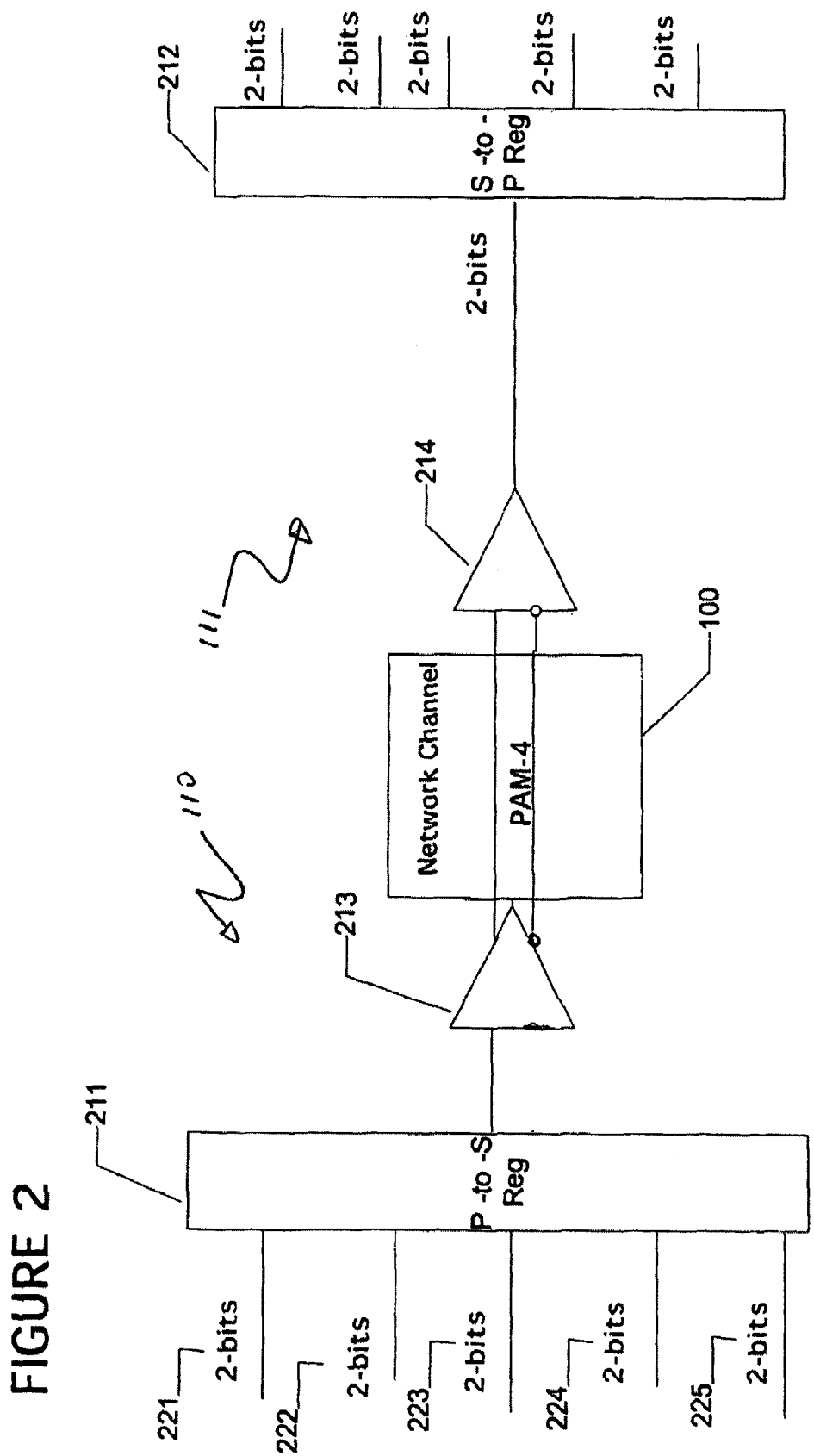
FIG. 2 illustrates an exemplary communications channel and portion of a transmitter/receiver module pair operating in accordance with one embodiment of the present invention.

FIG. 2 illustrates an exemplary communications channel according to one embodiment of the present invention. The communications channel 100 enables or facilitates transmission of information between associated pairs of transmitters and receivers, for example, transmitter 110 and receiver 111. In one embodiment, transmitter 110 and receiver 111 employ a multilevel pulse amplitude modulated (PAM-n) communications technique. For example, transmitter 110 and receiver 111 may employ a PAM-4 signaling technique to send two bits of data through channel 100. That is, the transmitter/receiver pair is used to send two bits of data for each symbol transmitted through the channel 100. A ten bit word is loaded into parallel-to-serial register 211 with the output of the register being a two bit pair that is transmitted through channel 100. Once received, the sequence of two bit codes are loaded into serial-to-parallel register 212 to reconstruct or decode the ten bit word.

In this particular embodiment, the transmitter and receiver pair employ a PAM-4 communications technique to send the two bits of data through channel 100. Each transmitter and receiver pair operates in the same manner; that is, each pair sends data through the channel in a serial fashion that packages two bits into one symbol. Five successive symbols are associated with each eight bit data byte. The additional overhead associated with this form of encoding is used to ensure adequate symbol crossings, necessary for timing recovery, and to provide DC balance on the line.

In addition, that overhead may also be used to transmit control information for controlling or modifying certain modules or circuitry of the communications system, for example an adaptive or adjustable equalizer in a transmitter. In addition, that overhead may also be used to allow the embedding of control information for controlling or modifying certain modules of the communications system, for example an adaptive equalizer in a transmitter. Thus, control information is that data which is used to control, modify, adjust, enhance, optimize, and/or initialize or re-initialize the operation, performance or function of various components or modules of the transceivers, receivers and transmitters of the system that are coupled via communications channel 100. The adaptive equalizer in the transmitter is one such component or module.

Although the present invention is described in the context of PAM-4 signaling techniques, the present invention may utilize other modulation formats that encode fewer or more bits per symbol codes based on other than byte wide user may be readily adapted or employed. Moreover, other communications mechanisms that use different encoding tables, other than four levels, or use other modulation mechanisms may also be used. For example, PAM-5, PAM-8, PAM-16, CAP, wavelet modulation and other encoding rates such as 16B9Q or 9B5Q (among others) could be utilized. In this regard, the techniques described herein are in fact applicable to any and all modulation schemes, including but not limited to, PAM-4 encoding described herein.

Figure 3:
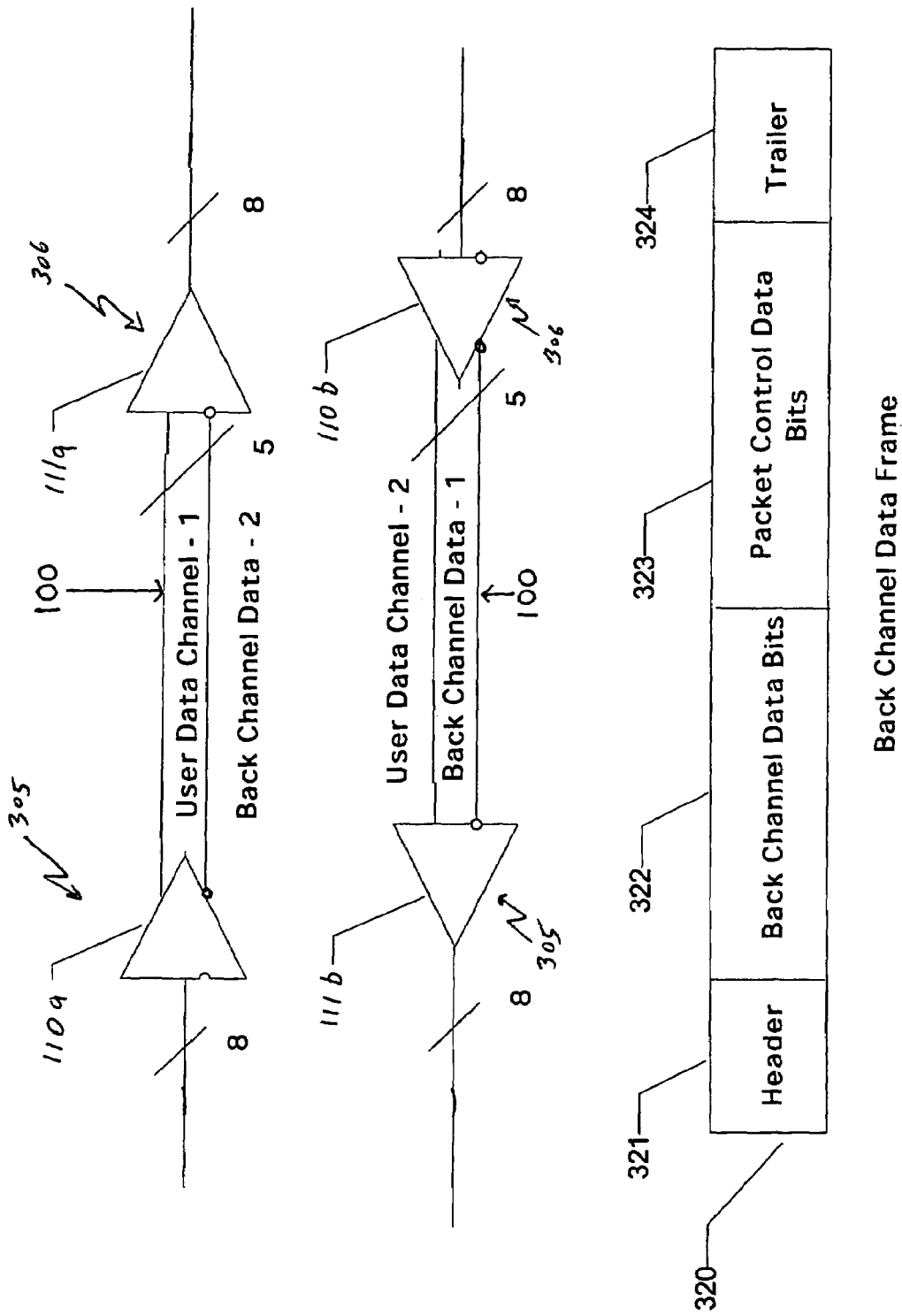
FIG. 3 illustrates a back channel communications path, including a back channel data frame, in accordance with one embodiment of the present invention.

FIG. 3 illustrates one embodiment of the present invention. The communications system typically possesses a number of unidirectional transmitter and receiver pairs (transmitter 110a and receiver 111a; and transmitter 110b and receiver 111b). Transmitter 110a and receiver 111b may be incorporated into transceiver 305 (in the form of an integrated circuit). Similarly, transmitter 110b and receiver 111a are incorporated into transceiver 306. From a system level perspective, there is a plurality of such transmitter/receiver pairs in simultaneous operation, for example, eight or nine transmitter/receiver pairs, communicating across communications channel 100.

In operation, the transmitter and receiver pairs simultaneously transmit data across channel 100. As mentioned above, the additional overhead associated with the particular encoding techniques may be used for transmitting control information in a back channel communications path. In one embodiment, the back channel forms a part of the user data channel. In this way, back channel data may be transmitted asynchronously at the same time user data is transmitted without reducing or significantly impacting the amount of channel communications capacity dedicated to user data.

The back channel data may provide information to an adaptive or adjustable equalizer to enhance or optimize the operation of the equalizer for a given environment. In this regard, the adaptive equalizers reside in each of the transmitters 110a and 110b. The control information for the equalizer in transmitter 110a (i.e., back channel 2) is embedded in the user data channel 1. The control information for the equalizer in transmitter 110b (i.e., back channel 1) is embedded in the user data channel 2.

The back channel data is typically sent in a back channel data frame or data packet 320. In one embodiment, data frame 320 includes frame header 321, a set of data bits 322, a set of control bits 323, and data frame trailer 324. The frame header 321 is used to mark the beginning of a data frame to allow the transmitter and receiver to remain synchronized as to the proper beginning of the data frame. The set of data bits 322 contains the data to be transmitted across the back channel and is distinguished from the set of control bits 323 used to control the operation of the back channel as necessary. Finally, data frame trailer 324 is used to mark the end of a data frame to further allow the transmitter and receiver to remain synchronized as to the proper end of the data frame.

It should be noted that other message formats and features, such as error correction or detection, may be implemented in the back channel frame. Indeed, any and all formats, whether now known or later developed, are intended to be within the scope of the present invention. Moreover, it is possible to construct an arbitrarily complex frame for the back channel information and have the frame carried by the sub channel described herein.

Figure 4:
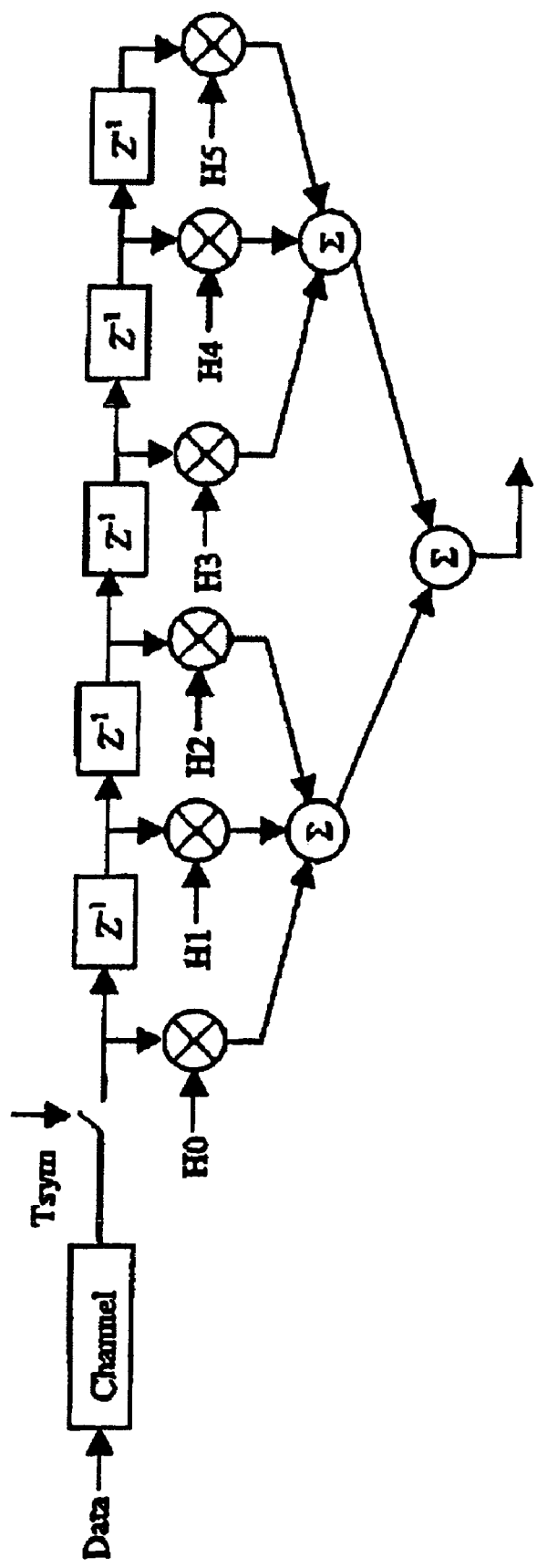
FIG. 4 illustrates a conventional equalizer structure.

With reference to FIG. 4, a conventional symbol-spaced equalizer implemented as a discrete-time system is capable of correcting for a channel pulse response duration or length of 5*Tsym seconds. A fractionally spaced equalizer is achieved by replacing the delay cells by other than unit delays. Many combinations of unit and non-unit delays are possible. The exemplary received pulse response shown in FIG. 5 may be much longer than a few symbol periods due to remote reflections, like those arising from impedance mismatches distributed along a channel.

It should be noted that the illustrated received pulse response may also "dispersed" as a result of non-flat frequency response and group delay on the communications channel. As such, the transmitted pulse may "spread-out" thereby creating intersymbol interference.

Moreover, the remote reflections on the line may create an image of the primary received pulse delayed by an arbitrary number of symbol periods. For the case of a backplane application, this delay may extend up to 18 symbol periods (M=18) or more. Thus, a conventional equalizer would require at least 18 taps for symbol spaced, or more than 18 taps for fractional spacing, to "see" and thus correct for reflected pulse(s).

Figure 5:
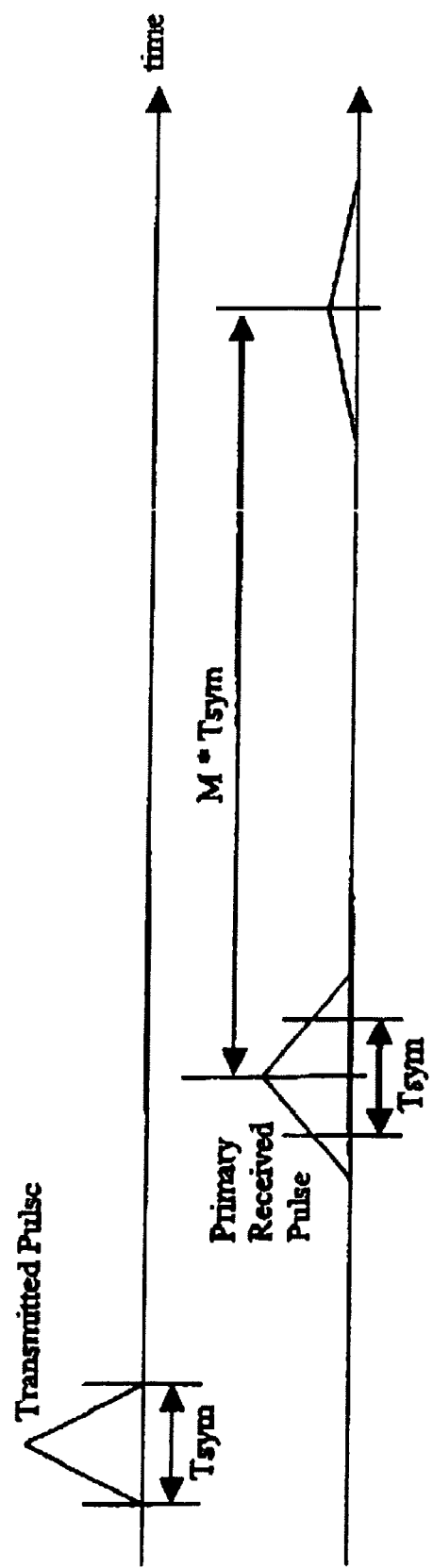
FIG. 5 illustrates a waveform of a pulse transmitted through a communications channel and the "received" pulse response.

Indeed, for the situation illustrated in FIG. 5, the optimal values for the coefficients of the intermediary taps may be zero or very close to zero. Thus, it may be desirable to eliminate the circuitry for taps that converge to zero.

The present invention employs an adaptive equalizer that includes one or more taps with a controllable displacement in time to minimize the need for, and thus the circuitry associated with, the intervening taps. In one aspect of the present invention, an equalizer includes at least one roving tap in combination with a fixed equalizer. In another aspect, the fixed structure equalizer coefficients (H0, H2), the roving tap location and/or coefficient M and Hr may be being generated or determined using information calculated or processed at the receiver module. In this regard, the adaptive equalizer may reside in the transmitter or the receiver. Indeed, in certain circumstances, it may be advantageous to implement an equalizer (variable delay FIR and/or fixed) in both the transmitter and the receiver.

In one embodiment, the transmitter module implements an equalizer structure that is realized as the summation of pseudo-differential currents through termination impedances at the output stage of the transmitter. Each pseudo-differential current coming from a thermometer encoded DAC—one thermometer DAC per filter tap. This embodiment may be particularly well suited to PAM-4 encoding techniques, in that each DAC may be realized as follows: use six equal strength current sources (three on the "plus" side and three on the "minus" side).

In operation, to represent the PAM-4 values of "−3, −1, +1, +3", the thermometer coded DAC turns on three of the six current sources. For example, a "+3" is generated by turning on the three "plus" current sources and turning on none of the three "minus" current sources (i.e., keeping the three "minus" current sources off). Further, "+1" is generated by turning on two of the "plus" current sources and one of the "minus" current sources. In contrast, a "−1" is generated by turning on one of the "plus" current sources and two of the "minus" current sources. Finally, a "−3" is made by turning on none of the "plus" current sources (i.e., keeping the three "plus" current sources off) and turning on the three "minus" current sources. The variable amplitude is realized by digitally controlling the strength of the current sources comprising the thermometer encoded DAC(s).

The number of delays for the data that is presented to each of the thermometer encoded DAC(s) determines its position in the filter. Each filter tap value is realized by modulating the strength of the current sources for the particular thermometer encoded DAC representing that filter tap. Thus, by employing this structure, there are no parallel stages for zero taps connected to the output. As such, the output capacitance of this structure is reduced. For high-speed applications, extra capacitance may be prohibitive because it may reduce the transmission bandwidth. Additionally, reducing power dissipation and die area are also concerns addressed by a system design in accordance with the present invention.

In another embodiment, the equalizer structure may be implemented digitally. In this embodiment, the equalizer structure performs the multiplication and summation digitally (using, for example, a processor) and presents the resulting digital words (filtered outputs) to one multi-bit DAC. In this embodiment a reduction in computation is a direct benefit of the roving tap.

Thus, in accordance with one aspect of the present invention, the transmitter and/or receiver includes (1) an equalizer having at least one roving tap and a fixed tap structure; and/or (2) the fixed structure equalizer coefficients (H0, H2), the roving tap location and/or coefficient M and Hr being generated or determined using information calculated or processed at or by the receiver module. In those circumstances where the coefficient information is determined using information calculated or processed at or by the receiver module, the coefficient information may be provided to the transmitter (and, ultimately to the adaptive equalizer located in the transmitter) via the back channel to control, enhance, modify or optimize the operation of the system.

Figure 6:
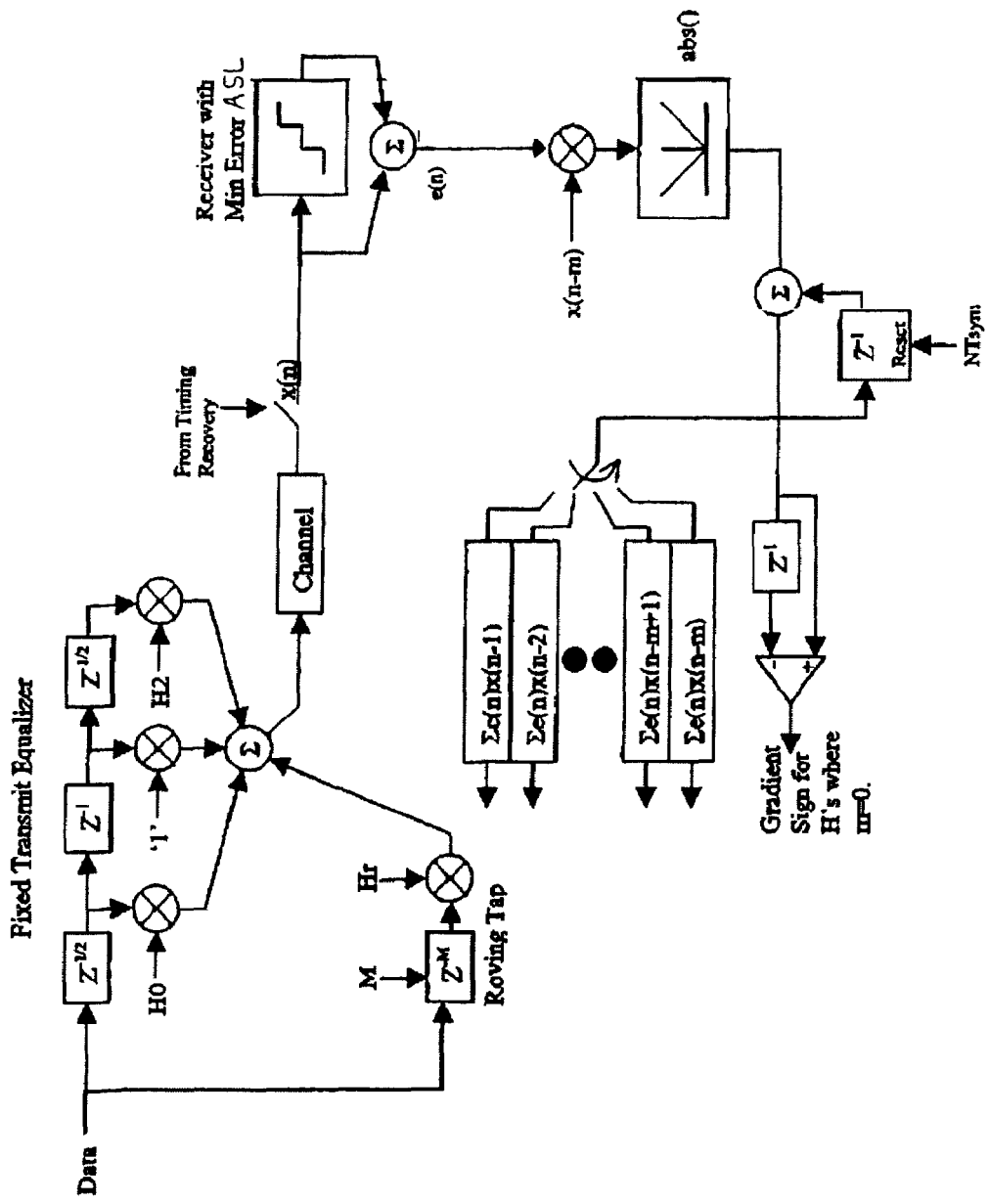
FIG. 6 illustrates a block diagram of a communications channel and a portion of a transmitter/receiver module pair, including an equalizer structure, according to one aspect of the present invention.

FIG. 6 illustrates a block diagram representation of the physical structure of an equalizer in accordance with the present invention. The equalizer of FIG. 6 is implemented in the transmitter and includes a FIR filter having four taps. Three of the four taps have a variable coefficient (H0, H2 and Hr) value and one of the taps has a variable delay element ($Z^M$). The tap with the variable delay element is the roving tap.

With continued reference to FIG. 6, the roving tap (Hr) is summed at the transmitter output with the "fixed" equalizer output (H0, 1, H2). In one preferred embodiment, the values of the equalizer coefficients and roving tap position (H0, H2, Hr, and M) are adjusted to reduce the correlation of the error, the difference between the received pulse and/or delayed versions of the received signal decided data D(n), i.e., e(n)=x(n)−D(n), with delayed versions of the received data x(n−m). This may be referred to as the cost function of the error. Each tap receives its own cost function calculation.

The tap adjustments or tap values may be initially determined during an auto-negotiation (AN), which is implemented at power-up or on demand. In addition, the tap adjustments may be performed intermittently, periodically or continuously during normal data transmission. In another embodiment, the tap adjustments may occur intermittently, periodically or continuously during normal data transmission and/or during an AN procedure. In the preferred embodiment (as shown in FIG. 6), the receiver module contains an automatic slicer level (ASL) module.

It should be noted that receiver module and the ASL module are described in detail in U.S. Provisional Patent Application Ser. No. 60/313,455 entitled "Automatic Slicer Level Adaption", filed Aug. 20, 2001, and non-provisional patent application entitled "System and Method for Providing Slicer Level Adaption", filed Aug. 16, 2002 (application Ser. No. 10/222,073). As mentioned above, these applications are incorporated by reference herein in their entirety.

It should be further noted that the Auto-Negotiation protocol is described in detail in U.S. Provisional Patent Application Ser. No. 60/313,454, entitled "Transceiver System for High Speed Digital Signaling", filed Aug. 20, 2001 and non-provisional patent application entitled "System and Method for High Speed Digital Signaling", filed Aug. 16, 2002 (application Ser. No. 10/222,122). As mentioned above, these applications are incorporated herein by reference in their entirety.

In the preferred embodiment, the cost function calculation and tap adjustments are determined or performed digitally in a multi-step procedure. In the first step, the cost function for H2 is determined. The cost function for H2 is computed by multiplying the present error by x(n−1), (m=1), taking the sign of the product and accumulating the sign of the product. The number of cycles of accumulation is highly application specific. Typically, the number of cycles is greater than 1000. In the preferred embodiment, the number of cycles is 1023 (N=1023). If the accumulated correlation is positive, the value of H2 is decreased by one. If the correlation is negative, the value of H2 is increased by one. This adjustment is stored temporarily in the receiver while the adjustment for H0 is performed.

Figure 7:
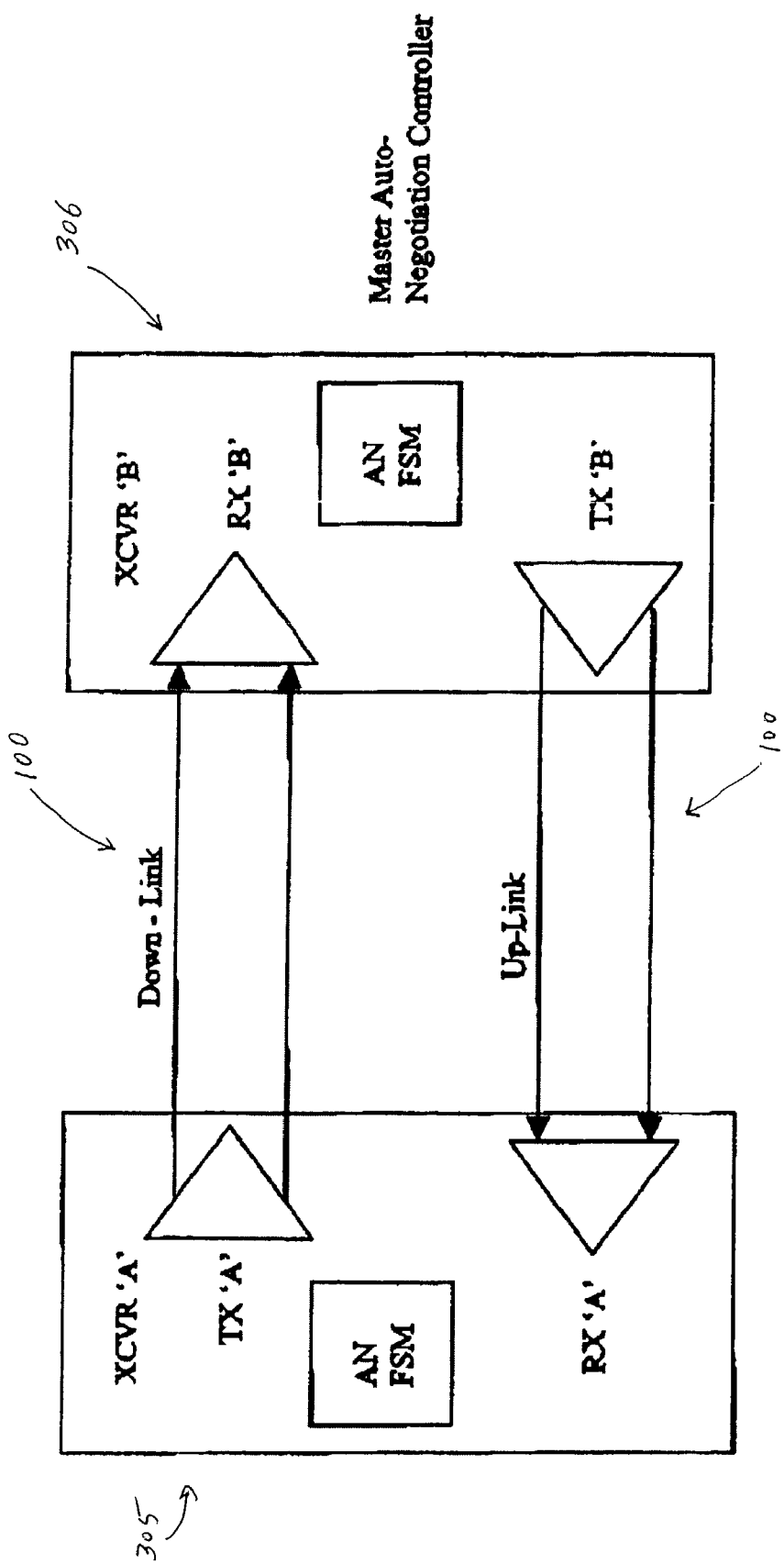
FIG. 7 illustrates a communications channel, in conjunction with transmitter/receiver module pairs, in accordance with one embodiment of the present invention.

The procedure for H0 is the same as for H2, except that the correlation is with the leading data; x(n+1), m=−1, is multiplied by the present error. A negative value of m is realized by adding in extra delay to the error. At the end of the procedure, if the accumulated correlation is positive, the value of H0 is decreased by one; if the correlation is negative, the value of H0 is increased by one. Once the adjustments for H2 and H0 have been calculated, they are sent to the transmitter and the transmitter equalizer values of H0 and H2 are adjusted (see FIG. 7 where Rx 'B' sends updated coefficients to Rx 'A' for use in Tx 'A' via a low data rate).

It should be noted that in one embodiment, the above steps are repeated 127 times to converge H0 and H2 before moving to the next step. For other applications, the number of times these steps are repeated may be higher or lower.

The next step in the AN process is to determine a value for M, the delay for the rover. To do this, the above procedure for computing the accumulated correlation for H2 is repeated for each of the possible delay values that M can take on (m is in the range of 2 to $M_{max}$) and these values are stored in registers. The value for M is chosen to be the position that produces the largest absolute value accumulated correlation. The value of M is sent to the transmitter and the transmitter equalizer value of M is set (see FIG. 7 where Rx 'B' sends updated coefficients to Rx 'A' for use in Tx 'A' via a low data rate). This process "fixes" the delay for the roving tap coefficient in time, and creates a particular structure for the equalizer.

In a preferred embodiment, the delay M is realized using a digital pipeline stage of length $M_{max}$ with the output of each stage forming one of the $M_{max}$ inputs of a mulitplexer. The value of M, the desired delay, is used to address the multiplexer. The output of the multiplexer is also gated so that no output is available prior to setting the address of the multiplexer to M.

The final step in the receiver AN process is to compute the final values for the equalizer coefficients (H0, H2, Hr). The same procedure that was used to compute adjustments to H2 and H0 and send them back to the transmitter is utilized with respect to equalizer coefficients (H0, H2, Hr)—with the addition that adjustments to Hr are also computed (using the value x(n−M)) and sent back the transmitter as well.

Due to possible correlation between H0, H2 and Hr, the process of determining the coefficient adjustments is repeated multiple times. In the preferred embodiment, the procedure is repeated 127 times (each coefficient has its adjustment computed 127 times).

After the structure of the equalizer is determined and implemented, normal data communications over channel 100 may commence.

It should be noted that there are many techniques for determining the coefficients of equalizer. All techniques for determining the coefficients, whether now known or later developed, are intended to be within the scope of the present invention.

In another embodiment of the present invention, the equalizer may include a plurality of roving taps. Under those circumstances where the equalizer includes a plurality of roving taps, one technique for determining the positions of the roving taps (using the nomenclature Nr to indicate the number of roving taps) is to use the procedure for computing the position of a single roving as stated above. The positions of the Nr largest absolute value accumulated correlations determine the Nr rover tap positions.

Another technique for determining the positions of the roving taps is to compute the rover positions in a sequential fashion, one at a time. After each rover position is determined, the equalizer is re-converged, i.e., all of the fixed taps and the rover taps with determined locations are converged as per the method of the preferred embodiment. The procedure is repeated Nr times until all of the rover locations are determined. It should be noted that in this technique, after a position of a given roving tap is determined, it may be advantageous to not assign later determined roving taps to the same location as earlier determined rovers.

In those situations, applications or environments having known reflections, a subset of the rover locations may be positioned or located at fixed or substantially fixed offsets. In this regard, a roving tap which is located at the substantially fixed offset may move or rove, if at all, a small distance from a given locations in small increments. The roving taps located at the substantially fixed offsets would address the impact of the known reflections. Permitting such roving taps to move a small distance about a fixed or known offset allows the system to make minor adjustments for slight variations between the environments or to accommodate manufacturing variations of the components (implemented in the channel having known reflections) or the channel.

In another embodiment, the rover position (positions) may be partly or entirely manually pre-programmed and the rover tap weight (weights) may be partly or entirely manually pre-programmed. Thereafter, any or all rover locations may be changed during normal data operation to compensate for changes in environmental conditions.

In yet another embodiment, the rover position (positions) and/or the rover tap weight (weights) are fixed to predetermined values stored in, for example a ROM or EEPROM. In certain situations, however such values may also be fine tuned to enhance the system performance. In this regard, after (or during) the performance of an initialization or reinitialization process, the system may implement fine adjustments to the rover position (positions) and/or the rover tap weight (weights). The fine adjustments to the position and weight may be accomplished using any of the techniques described above. Indeed, all techniques for determining these levels, whether now known or later developed, are intended to be within the scope of the present invention.

It should be noted that additional embodiments arise by changing the form of the correlation in any of the embodiments to, including but not limited to, sign-sign, sign-value, value-sign, and value-value (as shown here) to generate the accumulated correlation. This would cover the storage of the residual error in both analog and digital implementations.

Additional embodiments arise by substituting D(n−m) for x(n−m) in any of the above embodiments.

Further, the equalizer may be located in the receiver in addition to, or instead of in the transmitter. In this regard, an equalizer is incorporated directly into the receiver. The "receiver" equalizer of this embodiment may be the same as or similar to the transmitter equalizer described above. Alternatively, the "receiver" equalizer may be implemented as a mixed signal equalizer with an analog delay line. Moreover, the equalizer of this embodiment may be a single ADC coupled to a processor or other digital logic circuits, similar to those described above.

In another embodiment, the roving taps may be grouped as a set whose controllable displacement in time is arranged or determined as a group. The group may consist of two, three or more taps. In this embodiment, the group of taps move together to adjust or modify the transmit signal so that the received signal is of better quality for the given transmission environment.

In one example, the group consists of three roving taps. Here, a first roving tap of the group may be characterized as a coarse adjustment of the transmit signal, a second roving tap of the group may be the medium adjustment, and a third roving tap of the group may be the fine adjustment. In this example, the first roving tap is positioned, placed or selected to make major modifications to the transmit signal. The second roving tap is positioned, placed or selected to make further modifications to the transmit signal or to compensate for overshoot or undershoot caused by or as a result of the first roving tap. Finally, the third roving tap may make fine adjustments to compensate for slight overshoot or undershoot caused by the previous placement, positioning or selection of the first and/or second roving taps of the group of roving taps.

In another example, the group may consist of two roving taps. In this embodiment, the first roving tap of the group may perform coarse adjustment of the transmit signal, and the second roving tap of the group may perform fine adjustment.

Other configurations or arrangements of the roving taps are possible. In this regard, the number of roving taps of the group may be selected based on additional cost, complexity and/or power consumption to a transmitter or transceiver.

In another embodiment, any number of roving taps of the group may be enabled or disabled as necessary or desired. In this regard, as the signal is equalized, it may be determined that the number of roving taps in the group need not be equal to the total number of taps in the group. Thus, if a roving tap is not necessary or used in the equalization process because, for example, elevated power consumption or limited power availability, it may be "turned off" or disabled. For example, where the group consists of three roving taps, and it is determined that the roving tap that performs medium adjustment of the transmit signal is not necessary, the transceiver may employ only those taps that perform coarse and fine adjustment of the transmit signal.

Thereafter, it may be determined that medium adjustment of the transmit signal is advantageous or necessary, the roving tap of the group that performs medium adjust may be "turned on" or enabled. This may result or be due to a detected change in the received signal as the environment of the transmission channel changes. The roving tap coefficients may be calculated using any of the techniques described above. Moreover, there are many other techniques for determining the coefficients of equalizer. Thus, all techniques for determining the coefficients, whether now known or later developed, are intended to be within the scope of the present invention.

FIG. 1 illustrates an exemplary operating environment in which the present invention may be implemented. The operating environment is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments and data communication systems that include any of the above systems or devices, and the like.

The invention may also be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed.

A processing device coupled to a communications channel 100 (via transceivers) typically includes at least some form of computer readable media. Computer readable media can be any available media that can be accessed by these devices. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, BC-ROM, digital versatile disks (DVD) or other optical storage, magnetic cassettes, magnetic tape, magnetic disk storage or other magnetic storage devices, or any other medium which can be used to store the desired information and which can be accessed by processing devices.

Communication media typically embodies computer readable instructions, data structures, program modules or other data in a modulated data signal such as a carrier wave or other transport mechanism and includes any information delivery media. The term "modulated data signal" may be characterized as a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

Additionally, the embodiments described herein may be implemented (in part) as logical operations performed by programmable processing devices. The logical operations of these various embodiments of the present invention are implemented (1) as a sequence of computer implemented steps or program modules running on a computing system and/or (2) as interconnected machine modules or hardware logic within the computing system. Accordingly, the logical operations making up the embodiments of the invention described herein can be variously referred to as operations, steps, or modules.

While the above embodiments of the present invention describe a variable delay FIR equalizer for serial baseband communications, one skilled in the art will recognize that the use of a particular version of an FIR filter and delay are merely example embodiments of the present invention. In an alternative embodiment, the incorporation of a feedback element into the equalizer structure, making it into an Infinite Impulse Response (IIR) structure, may be employed in situations where the channel to be equalized demands a long tail on the equalizer in addition to having remote reflection sources. In this embodiment, it would be more likely to make some of or all of the numerator (feed forward) taps of the equalizer roving. However, a sparse structure for the denominator (feedback) taps could also be utilized either solely or in conjunction with roving numerator taps. It is to be understood that other embodiments may be utilized and operational changes may be made without departing from the scope of the invention.

As such, the foregoing description of the exemplary embodiments of the invention has been presented for the purposes of illustration and description. They are not intended to be exhaustive or to limit the invention to the precise forms disclosed. Many modifications and variations are possible in light of the above teaching. It is intended that the scope of the invention be limited not with this detailed description, but rather by the claims appended hereto. The present invention is presently embodied as a method, apparatus, and article of manufacture for providing a variable delay FIR equalizer for serial baseband communications.

What is claimed is:

1. A system for transmission of data through a communication channel between a first transmitter and a first receiver, comprising:
   a fixed tap module, located in the first transmitter, including at least one fixed tap location;
   a roving tap module, located in the first transmitter, including at least one movable tap location;
   a set of adjustable delay coefficients, including at least one adjustable delay coefficient for at least one movable tap location;
   a set of adjustable filter coefficients, including at least one adjustable filter coefficient for at least one movable tap location and at least one adjustable filter coefficient for at least one fixed tap location; and
   wherein at least one adjustable filter coefficient, of the set of adjustable filter coefficients, is determined by the first transmitter in response to an adjustment received from the first receiver through a back channel within an overhead associated with an encoding technique.

2. The apparatus according to claim 1 wherein the communications channel is a backplane.

3. A system for transmission of data through a communication channel between a first transmitter and a first receiver, comprising:
   a fixed tap module, located in the first transmitter, including at least one fixed tap location;
   a roving tap module, located in the first transmitter, including at least one roving tap that has a variable delay element;
   a set of adjustable coefficients, including at least one adjustable filter coefficient for at least one movable tap location, at least one adjustable filter coefficient for at least one fixed tap location and at least one adjustable delay coefficient for at least one movable tap location;
   wherein the adjustable delay coefficient is use to variably adjust the location of the roving tap.

4. The apparatus according to claim 3, wherein at least one adjustable filter coefficient, of the set of adjustable coefficients, is determined by the first transmitter in response to an adjustment received from the first receiver.

5. The apparatus according to claim 3, wherein an adjustable coefficient, of the set of adjustable coefficients, is adjusted by a transmission, from the first receiver to the first transmitter, over a back channel that does not significantly impact the capacity to send user data in a same direction as the back channel.

6. The apparatus according to claim 3 wherein the communications channel is a backplane.

7. A method for transmission of data through a communication channel between a first transmitter and a first receiver, comprising:
    determining an adjustment in the first receiver;
    determining in the first transmitter, in response to the adjustment received through a back channel within an overhead associated with an encoding technique, an adjustable filter coefficient of a set of adjustable coefficients; and
    wherein the set of adjustable coefficients, that applies to taps located on the first transmitter, includes an adjustable filter coefficient for a movable tap location, an adjustable delay coefficient for the movable tap location and an adjustable filter coefficient for a fixed tap location.

8. The method of claim 7, wherein the communications channel is a backplane.

9. A method for transmission of data through a communication channel between a first transmitter and a first receiver, comprising:
    determining, at the first receiver, a correlation of error;
    adjusting a first adjustable coefficient, of a set of adjustable coefficients, to reduce the correlation of error;
    wherein the set of adjustable coefficients, that applies to taps located on the first transmitter, includes an adjustable filter coefficient for a movable tap location, an adjustable delay coefficient for the movable tap location and an adjustable filter coefficient for a fixed tap location, and
    wherein the adjustable delay coefficient is used to variably adjust the location of the roving tap.

10. The method of claim 9, further comprising:
    determining an adjustment in the first receiver; and
    determining in the first transmitter, in response to the adjustment, the first adjustable filter coefficient.

11. The method of claim 9, wherein the step of adjusting further comprises:
    transmitting, from the first receiver to the first transmitter, over a back channel that does not significantly impact the capacity to send user data in a same direction as the back channel.

12. The method of claim 9, wherein the communications channel is a backplane.

* * * * *